(12) United States Patent
Jung

(10) Patent No.: US 9,775,114 B2
(45) Date of Patent: Sep. 26, 2017

(54) METHOD AND APPARATUS FOR TRANSMITTING AND RECEIVING SIGNAL IN COMMUNICATION SYSTEM

(71) Applicant: Samsung Electronics Co., Ltd., Suwon-si, Gyeonggi-do (KR)

(72) Inventor: Jung-Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 14/791,709

(22) Filed: Jul. 6, 2015

(65) Prior Publication Data

US 2015/0312864 A1 Oct. 29, 2015

Related U.S. Application Data

(63) Continuation of application No. 13/772,885, filed on Feb. 21, 2013, now Pat. No. 9,078,268.

(30) Foreign Application Priority Data

Feb. 21, 2012 (KR) ........................ 10-2012-0017535

(51) Int. Cl.
*H04W 72/00* (2009.01)
*H04W 40/00* (2009.01)
(Continued)

(52) U.S. Cl.
CPC ........... *H04W 52/04* (2013.01); *H04W 40/08* (2013.01); *H04W 48/20* (2013.01); *H04W 72/08* (2013.01); *H04W 74/004* (2013.01); *Y02B 60/50* (2013.01)

(58) Field of Classification Search
CPC ... H04W 52/04; H04W 72/08; H04W 74/004; H04W 48/20; H04W 48/08; H04W 16/28;
(Continued)

(56) References Cited

U.S. PATENT DOCUMENTS 6,147,981 A * 11/2000 Prescott ................ H04W 52/24
370/200
6,850,741 B2 2/2005 Lei et al.
(Continued)

FOREIGN PATENT DOCUMENTS

WO 00/02329 A1 1/2000
WO 03/096710 A2 11/2003
(Continued)

OTHER PUBLICATIONS

Ericsson, Downlink reference signals, TSG-RAN WG1 #46bis, R1-062855, Oct. 4, 2006, Seoul, Korea.
(Continued)

*Primary Examiner* — William Nealon
(74) *Attorney, Agent, or Firm* — Jefferson IP Law, LLP

(57) ABSTRACT

A method of transmitting/receiving signals at a terminal in a communication system is provided. The method includes determining at least one first reception path with a lowest path loss from among first reception paths that receive a first reference signal from a base station, receiving a second reference signal through second paths set up based on the at least one first reception path, and transmitting an uplink access signal with a second uplink transmitting beam that corresponds to a second downlink receiving beam corresponding to a second path having a lowest path loss.

20 Claims, 11 Drawing Sheets

(51) Int. Cl.
*H04W 52/04* (2009.01)
*H04W 72/08* (2009.01)
*H04W 40/08* (2009.01)
*H04W 48/20* (2009.01)
*H04W 74/00* (2009.01)

(58) Field of Classification Search
CPC ...... H04W 72/042; H04L 5/00; H04B 7/0634; H04B 7/0617
USPC ...... 455/522, 525, 439, 452.1; 370/252, 329
See application file for complete search history.

(56) References Cited

U.S. PATENT DOCUMENTS

| | | | |
|---|---|---|---|
| 7,095,987 B2 | 8/2006 | Brothers, Jr. et al. | |
| 7,233,283 B2* | 6/2007 | Kikuchi | H01Q 3/2605 342/372 |
| 7,672,282 B1 | 3/2010 | Chhabra | |
| 8,165,595 B2 | 4/2012 | Xia et al. | |
| 8,565,193 B2* | 10/2013 | Ylitalo | H01Q 1/246 370/252 |
| 2004/0156443 A1 | 8/2004 | Dent | |
| 2005/0037799 A1* | 2/2005 | Braun | H04W 16/28 455/525 |
| 2005/0215289 A1 | 9/2005 | Rensburg et al. | |
| 2007/0213011 A1* | 9/2007 | Kim | H04B 7/0617 455/63.1 |
| 2009/0189812 A1 | 7/2009 | Xia et al. | |
| 2009/0298502 A1 | 12/2009 | Hagerman et al. | |
| 2009/0318157 A1 | 12/2009 | Hoshino et al. | |
| 2010/0081449 A1 | 4/2010 | Chaudhri et al. | |
| 2011/0255434 A1* | 10/2011 | Ylitalo | H01Q 1/246 370/252 |
| 2013/0100922 A1 | 4/2013 | Ahn et al. | |
| 2014/0056256 A1 | 2/2014 | Kim et al. | |

FOREIGN PATENT DOCUMENTS

| | | |
|---|---|---|
| WO | 2011/162520 A2 | 12/2011 |
| WO | 2013/022292 A2 | 2/2013 |

OTHER PUBLICATIONS

3GPP TR 25.814, 3rd Generation Partnership Project; Technical Specification Group Radio Access Network; Physical Layer Aspects for Evolved UTRA, May 22, 2006, Sophia Antipolis, France.

* cited by examiner

METHOD AND APPARATUS FOR TRANSMITTING AND RECEIVING SIGNAL IN COMMUNICATION SYSTEM

PRIORITY

This application is a continuation application of a prior application Ser. No. 13/772,885, filed on Feb. 21, 2013, which claimed the benefit under 35 U.S.C. §119(a) of a Korean patent application filed on Feb. 21, 2012 in the Korean Intellectual Property Office and assigned Serial number 10-2012-0017535, the entire disclosure of which is hereby incorporated by reference.

BACKGROUND OF THE INVENTION

1. Field of the Invention

The present invention relates to communication systems. More particularly, the present invention relates to a method and apparatus for transmitting/receiving signals in a communication system.

2. Description of the Related Art

The use of terminals such as, for example, smartphones has led to an exponential increase in the average amount of data being used by mobile communication users as well as a constant increase in user demand for higher data transmission rate. In general, as a method of providing higher data transmission rate, there are methods of providing communications on wider frequency bands and methods of improving frequency usage efficiency. However, achieving sufficiently higher data transmission rates with the latter method is difficult because recent communication technologies have met limitations in improving the frequency usage efficiency through technical enhancements because such technologies have already been providing a frequency usage efficiency as close to a theoretical limit as possible. Thus, a feasible method of improving the data transmission rate may be focused on providing data services via wider frequency band. In this regard, available frequency bands must be considered when improving the data transmission rate by providing data services via a wider frequency band. Under the current frequency distribution policy, over a 1 GHz band available for wideband communications is limited and thus, selectable frequency bands in reality are only some ultra-high frequency bands (e.g., millimeter wave bands over 30 GHz). In contrast to cellular systems according to the related art that use 2 GHz bands, in systems that use ultra-high frequency bands, severe signal attenuation occurs over distance. The signal attenuation significantly reduces service coverage of a base station that uses the same power as a cellular system according to the related art. To solve this problem, a beamforming technique is widely used to increase transmission/reception efficiency of antennas by concentrating transmission/reception power within a narrow space.

FIG. 1 illustrates a base station and a terminal that provide beamforming using an array antenna according to the related art.

Referring to FIG. 1, a base station 110 may transmit data by alternating downlink transmission (TX) beam directions using a plurality of array antennas (Array0, Array 1) in each cell. A terminal 130 may also receive the data by alternating its reception (RX) beam directions.

In a system that communicates using the beamforming technique, the base station 110 and the terminal 130 provide data services by selecting transmitting and receiving beam directions that show or demonstrate an optimum channel condition from among various transmitting beam directions and receiving beam directions. This equally applies not only to downlink channels for data transmission from the base station 110 to the terminal 130 but also to uplink channels for data transmission from the terminal 130 to the base station 110. Assuming that there are N directions of the transmitting beam available to the base station 110 and M directions of the receiving beam available to the terminal 130, the simplest method of selecting the optimum downlink transmission/reception direction is for the base station 110 to transmit a predetermined signal more than at least M times in each of N transmission directions and for the terminal 130 to receive each of N transmitting beams using the M transmitting beams. According to this method, the base station 110 transmits a particular reference signal at least N×M times, and the terminal 130 receives the reference signal N×M times and measures reception strength of the received signal. The terminal 130 may determine a direction that shows or demonstrates the strongest measurement among the corresponding N×M measurements to be the optimum transmission/receiving beam direction. A process for the base station 110 to transmit a signal more than one time in all directions available for transmission is called a beam sweeping process, and a process for the terminal 130 to select an optimum transmission/receiving beam direction is called a beam selection process. The beam selection process may equally apply to a process of uplink data transmission/reception from the terminal 130 to the base station 110.

In cellular systems according to the related art, the base station 110 transmits common control channels, such as sync channels SCH or broadcast channels BCH all over the coverage of the base station. In a system that communicates using the beamforming technique, as shown in FIG. 1, in order to transmit the sync channels and the broadcast channels all over the coverage of the base station 110, the base station 110 transmits the channels in all directions available for transmission in the beam sweeping process. Frequency of transmission required to transmit the sync channel and the broadcast channel in the beam sweeping process is proportional to the number of transmitting beams present in the coverage of the base station. Thus, the simplest way of reducing transmission overhead of broadcast-type channels is to cover the entire coverage of the base station 110 with a fewer number of transmitting beams. In order to cover the entire coverage of the base station with a fewer number of transmitting beams, each transmitting beam should have a wide beam width. For example, to cover a sector 60 degrees wide with two transmitting beams, each of the two transmitting beams should be about 30 degrees wide.

However, as the beam width becomes wider, the beamforming effect is reduced in proportion to the beam width, and as the beam width becomes narrower, the beamforming effect is increased. If the beam width narrows to increase the beamforming effect, the number of transmitting beams required to cover the coverage of a single base station must increase accordingly, and thus the overhead for transmitting the broadcast-type channels also increases. Consequently, there is trade-off relation between the beamforming effect and the overhead for transmission of broadcast channels.

To solve this problem effectively, a scheme of diversifying the beam width used to transmit broadcast channels and the beam width used to transmit user data is used. For example, within a 60-degree sector, a transmitting beam 30 degrees wide may be used to transmit broadcast channels and a transmitting beam 10 degrees wide may be used to transmit the user data. In the scheme that uses a plurality of beam widths, a transmitting beam having a wide beam width is called a wide beam, and a transmitting beam having a narrow beam width is called a narrow beam or a fine beam.

The foregoing downlink beam sweeping and beam selection processes may be equally applied to a random access process in which the terminal first establishes a channel to transmit data to the base station.

FIG. 2 illustrates transmitting beams being transmitted by a terminal for uplink random access according to the related art.

Referring to FIG. 2, a number of transmitting beams is determined on the assumption that the base station has 4 receiving beam directions and the terminal has 4 transmitting beam directions.

The terminal transmits transmitting beams in all available directions toward each receiving beam of the base station. Similarly, the base station transmits transmitting beams in all available directions toward each receiving beam of the terminal. As illustrated in FIG. 2, the process is repeated for a total of 16 cycles. The base station then makes a plurality of attempts to detect random access information of the terminals with each uplink receiving beam (e.g., the base station attempts to detect a random access signal 4 times for each receiving beam, which corresponds to a total of 16 times). Accordingly, the base station may receive the random access information with transmitting and receiving beams that show or demonstrate the optimum reception performance.

In the meantime, during the random access procedure, the base station generally uses a beam having a beam width that is of a similar width as to downlink broadcast type channels as the receiving beam in order to reduce the foregoing beam sweeping overhead. However, for the uplink channel that requires maximum transmission power of the terminal, which is about 20 dB lower than the transmission power of the base station, a higher level of beamforming effect needs to be used than that of the downlink transmission channel. To achieve the higher level of beamforming effect, a receiving beam having a narrower beam width should be used to receive the random access signal. For example, if 4 receiving beams are replaced with 16 receiving beams having narrower beam widths, the base station has to attempt to detect the random access signal of the terminal 4 times for each receiving beam, which corresponds to a total of 64 (16×4) times that the base station has to attempt to detect the random access signal of the terminal. It is seen from the example that using the narrow receiving beam to receive the random access signal causes huge overhead relative to a system using the wide receiving beam.

Furthermore, to perform the foregoing random access operation, the terminal uses sufficient transmission power to cope with a path loss due to signal attenuation over distance between the base station and the terminal or attenuation effects caused from signal scattering and absorption at a mirror. In the communication system according to the related art, the terminal measured the path loss based on a difference between information about transmission intensity at the base station when the base station transmits a reference signal on the downlink communication channel and information about reception intensity at the terminal when the terminal receives the reference signal on the downlink communication channel. However, in case of the wideband communication system using the beamforming technique, in uplink random access, different path losses may occur depending on transmitting/receiving beam directions and transmitting/receiving beam widths, and thus disabling to use of existing path loss compensation techniques known to the communication system according to the related art.

Therefore, a need exists for a system and method for transmitting/receiving signals in a communication system that performs beamforming using a plurality of beam widths.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for transmitting/receiving signals in a communication system that performs beamforming using a plurality of beam widths.

Another aspect of the present invention is to provide a method and apparatus for transmitting/receiving signals to efficiently set up a transmission direction and transmission power for an uplink access signal in establishing a communication channel between a transmitter and a receiver in a communication system that performs beamforming using a plurality of beam widths.

Another aspect of the present invention is to provide a method and apparatus for transmitting/receiving signals to efficiently set up a transmission direction and transmission power for an uplink access signal in a beamforming based cellular communication system consisting of a plurality of base stations and a plurality of terminals, between which there are a plurality of transmission/receiving beams with a plurality of beam widths.

Another aspect of the present invention is to provide a method and apparatus for transmitting/receiving signals to efficiently set up a transmission direction and transmission power for an uplink access signal in a beamforming based cellular communication system consisting of a base station having a plurality of beam widths and a terminal only having a beam width.

In accordance with an aspect of the present invention, a method of transmitting/receiving signals at a terminal in a communication system is provided. The method includes determining at least one first reception path with a lowest path loss from among first reception paths on which a first reference signal is received from a base station, receiving a second reference signal through second paths set up based on the at least one first reception path, and transmitting an uplink access signal with a second uplink transmitting beam that corresponds to a second downlink receiving beam corresponding to a second path having a lowest path loss.

In accordance with another aspect of the present invention, a method of transmitting/receiving signals at a base station in a communication system is provided. The method includes transmitting a first reference signal with at least one first downlink transmitting beam, transmitting a second reference signal with second downlink transmitting beams that correspond to each of the at least one first downlink transmitting beam, and receiving from a terminal an uplink access signal with a second uplink receiving beam that corresponds to at least one of the second downlink transmitting beams.

In accordance with another aspect of the present invention, a terminal for transmitting/receiving signals in a communication system is provided. The terminal includes a controller for determining at least one first reception path with a lowest path loss from among first reception paths on which a first reference signal is received from a base station, for receiving a second reference signal through second paths set up based on the at least one first reception path, and for controlling a transceiver to transmit an uplink access signal with a second uplink transmitting beam that corresponds to a second downlink receiving beam belonging to a second path having a lowest path loss.

In accordance with another aspect of the present invention, a base station for transmitting/receiving signals in a communication system is provided. The base station includes a controller for controlling a transceiver to transmit a first reference signal with at least one first downlink transmitting beam and transmit a second reference signal with second downlink transmitting beams that correspond to each of the at least one first downlink transmitting beam, and a receiver for receiving from a terminal an uplink access signal with a second uplink receiving beam that correspond to at least one of the second downlink transmitting beams.

In accordance with another aspect of the present invention, a terminal for transmitting/receiving signals in a communication system is provided. The terminal includes a controller for controlling to receive a first reference signal transmitted from a base station with at least one first transmitting beam, calculating a first path loss for each beam paths on which the first reference signal is received, for controlling to receive a second reference signal transmitted from the base station with at least one receiving beam selected based on information about the first path loss, setting up transmission direction and transmission power for an uplink access signal based on the received second reference signal, and for controlling to transmit the uplink access signal to the base station based on the transmission direction and the transmission power, and a receiver for receiving the first reference signal and the second reference signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention efficiently set up a transmission direction and transmission power for an uplink access signal in establishing a communication channel between a base station and a terminal in a communication system that performs beamforming using a plurality of beam widths.

A method and apparatus for transmitting/receiving signals according to an exemplary embodiment of the present invention will now be described in connection with a cellular-based beamforming system that comprises a plurality of base stations and a plurality of terminals as an example of the communication system that performs beamforming. Exemplary embodiments of the present invention are applicable to both when the base station has a plurality of beam widths while the terminal only has one beam width and when both of the base station and the terminal have a plurality of beam widths.

Figure 1:
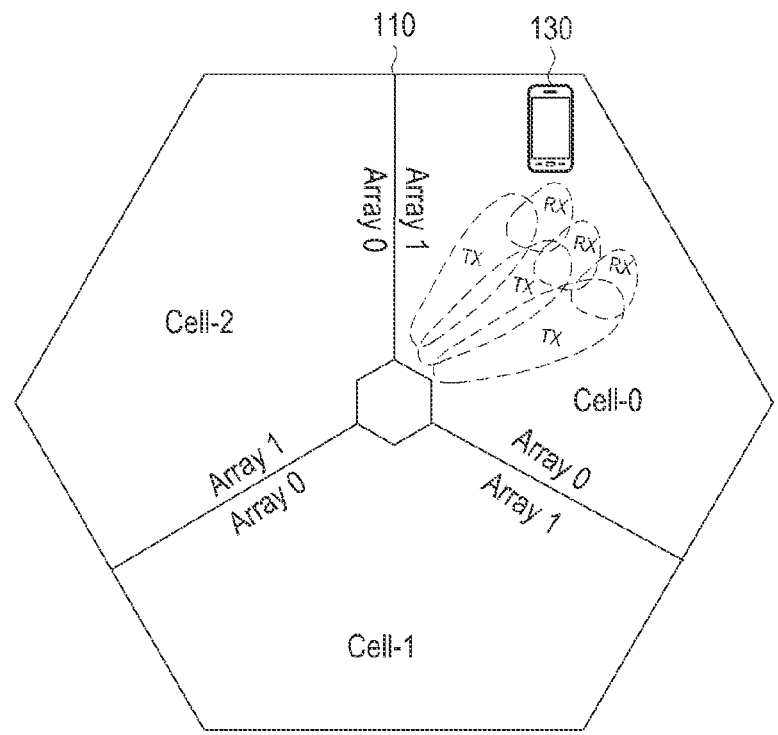
FIG. 1 illustrates a base station and a terminal that provide beamforming with an array antenna according to the related art.
Figure 2:
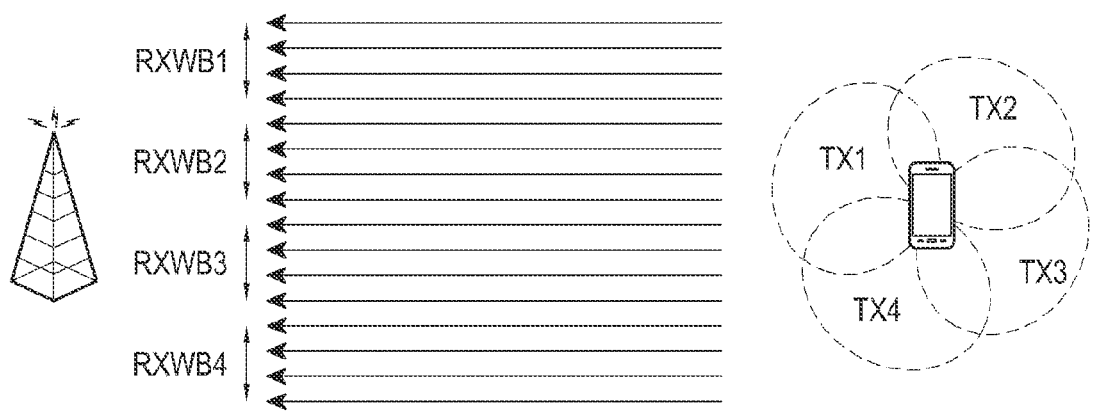
FIG. 2 illustrates transmitting beams being transmitted by a terminal for uplink random access according to the related art.
Figure 3:
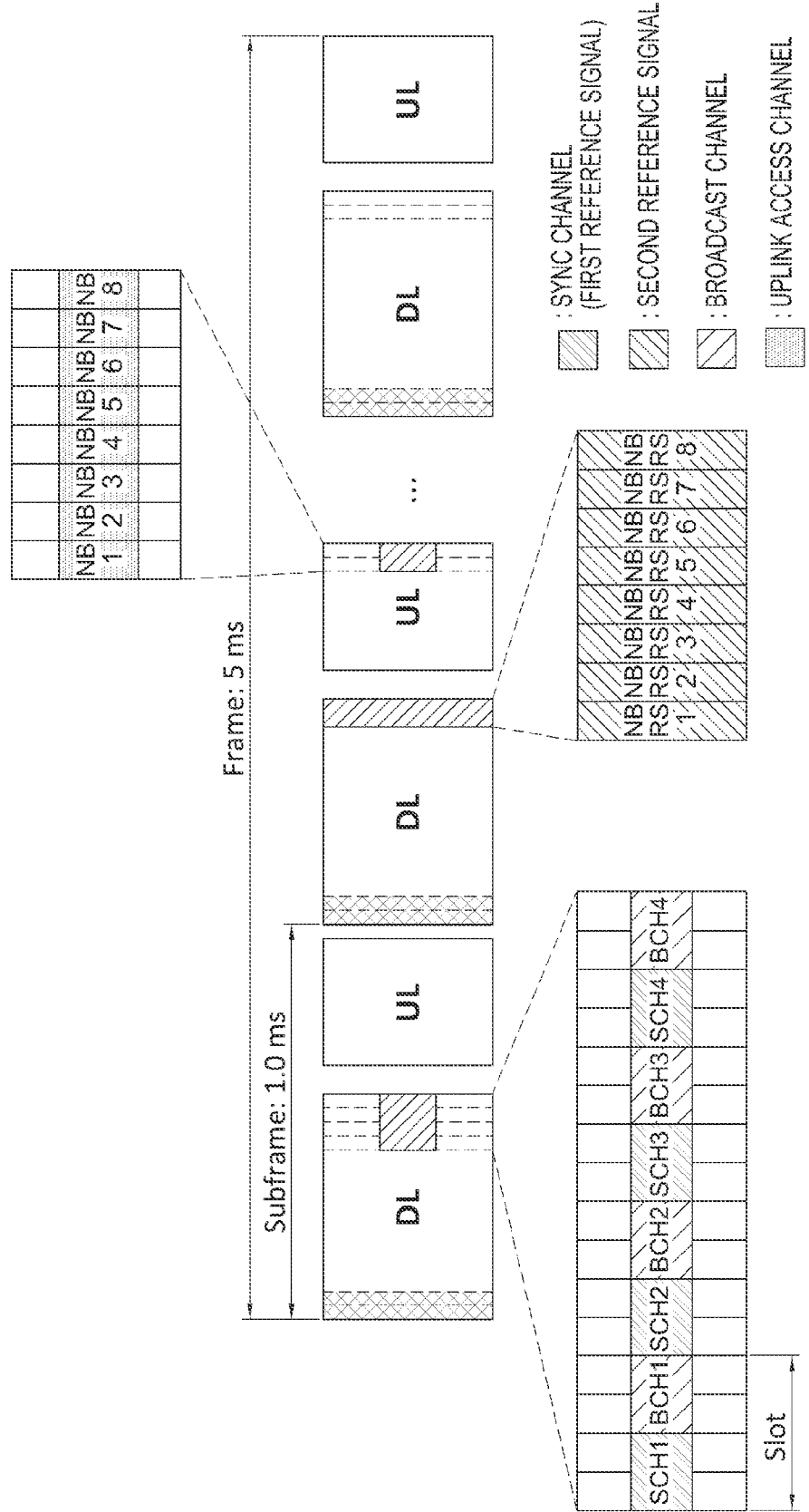
FIG. 3 illustrates a frame structure for signal transmission/reception in a communication system that uses a beamforming technique according to an exemplary embodiment of the present invention.

FIG. 3 illustrates a frame structure for signal transmission/reception in a communication system that uses a beamforming technique according to an exemplary embodiment of the present invention.

Referring to FIG. 3, a frame is 5 ms long and includes 5 sub-frames. Each sub-frame may be divided into a downlink channel for transmitting data from a base station to a terminal and an uplink channel for transmitting data from the terminal to the base station.

According to an exemplary embodiment of the present invention, a part of the downlink channel is used to transmit common information to control terminals, such as Sync CHannel (SCH) and Broadcast CHannel (BCH). For example, as illustrated in FIG. 3, the base station that uses a beamforming technique repeatedly transmits a sync channel that includes a predetermined first reference signal by using Wide transmitting Beams (WBs) in four transmission directions SCH1, SCH2, SCH3, and SCH4. The base station also repeatedly transmits control information to be transmitted all over the coverage of the base station on the BCH in respective directions BCH1, BCH2, BCH3, and BCH4. Thereafter, the base station transmits second reference signals NB RS1 to NB RS8 using narrow transmitting beams to support beam refinement in some parts of the downlink data transmission channel.

In the frame structure of FIG. 3, the terminal first receives the first reference signal transmitted with the wide transmitting beam on the sync channel, selects a base station from which the best signal has been received, establishes a system sync with the base station, and receives system information on the broadcast channel. Thereafter, the terminal begins a procedure of selecting an optimal transmitting beam to data transmission/reception from among narrow transmitting beams provided by the base station by receiving the second reference signal transmitted with narrow beams in many different directions using receiving beams in many different directions.

In the frame structure of FIG. 3, a part of uplink data transmission channel is used for transmission of uplink random access signals transmitted first by terminals to establish channels with the base station. In FIG. 3, the base station repeatedly receives random access signals transmitted by terminals using the Narrow receiving Beams (NBs) NB1 to NB8 in a period of time and a frequency range assigned for each narrow receiving beam.

Hereinafter, the terms 'wide transmitting beam' and 'narrow transmitting beam' transmitted by the base station will be interchangeably used with terms 'downlink wide transmitting beam' and 'downlink narrow transmitting beam', respectively. The term 'narrow receiving beam' with which the base station receives the uplink access signal transmitted by the terminal will be interchangeably used with the term 'uplink narrow receiving beam'. In addition, the term 'trans-mitting beam' with which the terminal transmits the uplink access signal may be interchangeably used with the term 'uplink transmitting beam'.

Figure 4:
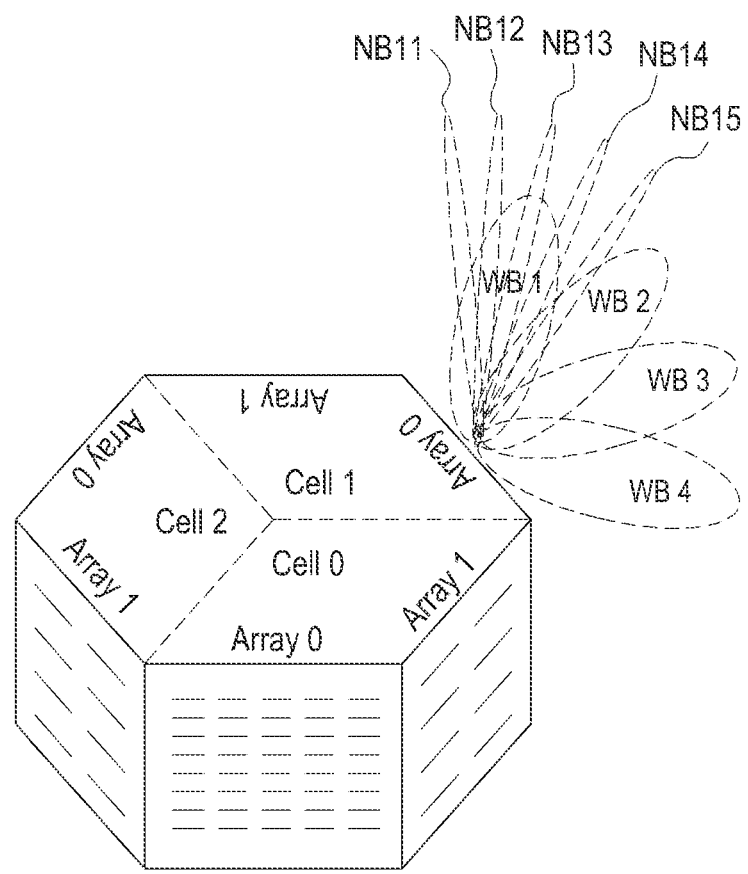
FIG. 4 illustrates a base station transmitting/receiving signals with wide transmitting beams and narrow transmitting beams in the communication system according to an exemplary embodiment of the present invention.

FIG. 4 illustrates a base station transmitting/receiving signals with wide transmitting beams and narrow transmitting beams in the communication system according to an exemplary embodiment of the present invention.

Referring to FIG. 4, according to an exemplary embodiment of the present invention, the wide transmitting beam and the narrow transmitting beam are assumed to have 1 to n correspondence. One way of defining such correspondence is to correspond a wide transmitting beam to all the narrow transmitting beams transmitted to an area (or in a direction) to which the wide transmitting beam is transmitted. For example as illustrated in FIG. 4, the correspondence may be defined such that a wide transmitting beam WB1 corresponds to all narrow transmitting beams NB11, NB12, NB13, NB14, and NB15. Similarly, WB2 may correspond to NB21 to N25, WB3 may correspond to NB31 to NB 35, and WB4 may correspond to NB41 to NB45.

According to an exemplary embodiment, the base station transmits a first reference signal all over the coverage of the base station with wide transmitting beams (e.g., WB1, WB2, WB3, and WB4), and transmits a second reference signal for beam refinement with narrow transmitting beams (e.g., using NB11 to NB45). The base station receives an uplink access signal from the terminal by using at least one of receiving beams that correspond to the narrow transmitting beams NB11 to NB45 provided by the base station.

According to an exemplary embodiment, the terminal selects the optimum wide transmitting beam and receiving beam based on the first reference signal transmitted from the base station, receives the second reference signal transmitted with a plurality of narrow transmitting beams that correspond to the wide transmitting beam, and selects at least one of the narrow transmitting beams provided by the base station that is optimal for data transmission/reception. In addition, the terminal selects at least one uplink narrow receiving beam that corresponds to the selected at least one narrow transmitting beam, and transmits the uplink access signal with the uplink transmitting beam that corresponds to the selected downlink receiving beam at an access time or at a frequency assigned for the selected uplink narrow receiving beam.

Referring to FIGS. 5 to 9, the terminal selects the optimum wide transmitting beam and receiving beam based on path loss information, selects at least one optimum narrow transmitting beam from among narrow transmitting beams that correspond to the optimal wide transmitting beam, and transmits the uplink access signal by using information about the selected at least one narrow transmitting beam and the receiving beam. In this regard, although the base station transmits the first reference signal with wide transmitting beams and transmits the second reference signal with narrow transmitting beams that correspond to the wide transmitting beam, FIGS. 5 to 9 illustrate the second reference signal being received only with beams selected by the terminal. Further, although the base station receives the uplink access signal with all the narrow receiving beams that correspond to the wide transmitting beams provided by the base station, only a process of transmitting and receiving the uplink access signal with the beams selected by the terminal is illustrated in FIGS. 5 to 9.

Figure 5:
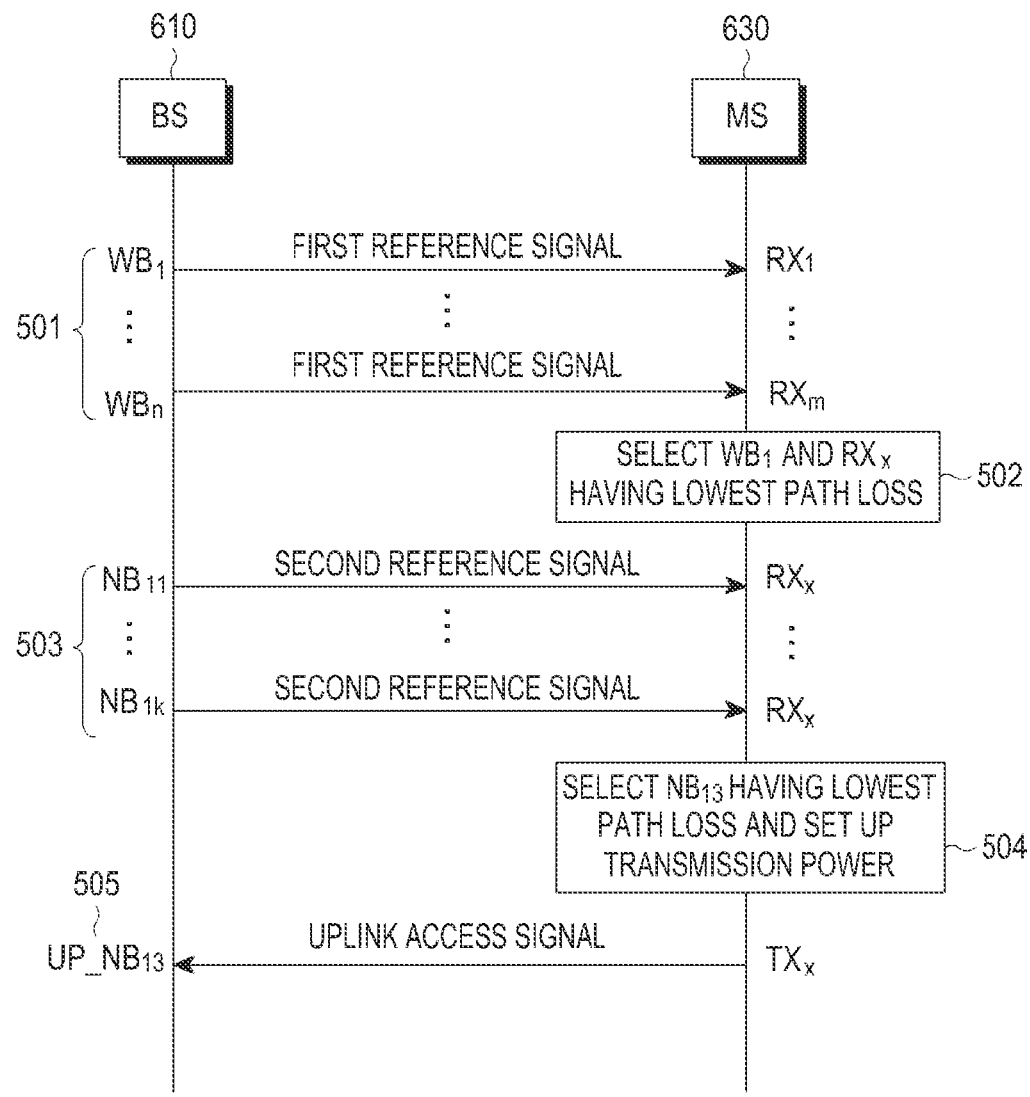
FIG. 5 illustrates a signal transmission/reception process between a Base Station (BS) and a Mobile Station (MS) or a Mobile Terminal (MT) in the communication system according to an exemplary embodiment of the present invention.

FIG. 5 illustrates a signal transmission/reception process between a Base Station (BS) and a Mobile Station (MS) or a Mobile Terminal (MT) in the communication system according to an exemplary embodiment of the present invention.

Referring to FIG. 5, in step 501, a BS 610 transmits the first reference signal all over the coverage of the BS 610 with wide transmitting beams WB1 to WBn. In this regard, the BS 610 repeatedly transmits the first reference signal (e.g., transmits the reference signal more than once) for each receiving beam of an MS 630 by taking into account the number of receiving beams of the MS 630 and using each of the wide transmitting beams WB1 to WBn. More specifically, assume that the MS 630 provides m receiving beams represented with RX1 to RXm. The BS 610 then transmits wide transmitting beams a total of n×m times by repeating each wide transmitting beam with which to transmit the first reference signal m times.

The MS 630 receives the first reference signal transmitted with the wide transmitting beams WB1 to WBn m times with receiving beams RX1 to RXm.

In step 502, the MS 630 measures reception performance of the first reference signal received for each of a total of n×m combinations of the wide transmitting beams and the receiving beams. The MS 630 calculates the path loss in each downlink transmission/reception direction by using a difference between the transmission power information and a measurement of the first reference signal, which is the received signal strength or received power. From the calculation results, the MS 630 selects a combination of the optimum transmission and receiving beams having the lowest path loss from among n×m combinations of wide transmitting beams and receiving beams. In an example illustrated in FIG. 5, the MS 630 selects the wide transmitting beam WB1 and the receiving beam RXx as the combination having the lowest path loss.

Upon completion of transmitting the first reference signal, the BS 610 transmits a second reference signal with narrow transmitting beams that correspond to each wide transmitting beam, in step 503. The number of the narrow transmitting beams that correspond to the wide transmitting beam, information about transmission time of the second reference signal, and transmission power information of the first and second reference signals may be determined in advance between the BS 610 and the MS 630, sent on a broadcast channel transmitted by the BS 610 with the wide transmitting beam, or sent using, for example, unicast signaling between the BS 610 and the MS 630.

According to an exemplary embodiment of the present invention, that one wide transmitting beam may correspond to k narrow transmitting beams. In such an example, the wide transmitting beam WB1 corresponds to narrow transmitting beams NB11 to NB1k. Thus, in step 503, the BS 610 transmits the second reference signal with n×k narrow transmitting beams NB11 to NBnk that correspond to the n wide transmitting beams WB1 to WBn. According to an exemplary embodiment of the present invention, in contrast to the first reference signal transmitted with the wide transmitting beams, the second reference signal transmitted with the narrow transmitting beams is transmitted a total of n×k times in each direction without taking into account the number of receiving beams of the MS 630. This may limit an overhead of beam sweeping with the narrow transmitting beams and the beam selection of the terminal Thereafter, the MS 630 receives the second reference signal transmitted with the narrow transmitting beams NB11 to NB1k that correspond to the selected wide transmitting beam WB1 by using the selected receiving beam RXx. The number of the narrow transmitting beams that correspond to the wide transmitting beam, transmission times, and transmission power information of the first and second reference signals transmitted with the wide transmitting beams and the narrow transmitting beams may be determined in advance between the BS 610 and the MS 630, sent on a broadcast channel transmitted by the BS 610 with the wide transmitting beam, or sent using, for example, unicast signaling between the BS 610 and the MS 630.

In step 504, the MS 630 selects a narrow transmitting beam with the lowest path loss (e.g., NB13) by calculating path losses between the narrow transmitting beams NB11 to NB1k and the receiving beam RXx. When transmitting the uplink access signal, the MS 630 sets up uplink transmission power based on one or more values of pieces of the path loss information for a plurality of measured downlink narrow transmitting beams, a reception power target value notified on the broadcast channel transmitted by the BS 610 all over its coverage or using, for example, unicast signaling transmitted directly to the MS 630, and other power control input values transmitted together with the reception power target value. For example, the MS 630 may use a sum of a particular path loss value, the reception power target value, and other power control input values to be the transmission power. Information about the uplink narrow receiving beam that corresponds to the downlink narrow transmitting beam, information about an access time or frequency resource assigned for the uplink narrow receiving beam may be determined in advance between the BS 610 and the MS 630, sent on the broadcast channel transmitted by the BS 610 with the wide transmitting beam, or sent using, for example, unicast signaling between the BS 610 and the MS 630. In another example, the MS 630 may set up (e.g., configure) the uplink transmission power based on either a path loss value of the selected downlink narrow transmitting beam NB13 or the largest of path loss values measured for the narrow transmitting beams NB11 to NB1k as a path loss value to be used in calculation of the uplink transmission power.

In step 505, the MS 630 transmits the uplink access signal with the transmitting beam TXx that corresponds to the receiving beam RXx at an access time or frequency assigned to the uplink narrow receiving beam UL_NB13 that corresponds to the transmitting beam NB13.

After transmitting the second reference signal, the BS 610 receives the uplink access signal using at least one of receiving beams that correspond to narrow transmitting beams NB11 to NBnk provided by the BS 610, in step 505. Information about the uplink access time or frequency resource assigned for the uplink narrow receiving beam that corresponds to the downlink narrow transmitting beam of the BS 610 may be determined in advance between the BS 610 and the MS 630, sent on the broadcast channel transmitted by the BS 610 with the wide transmitting beam, or sent using, for example, unicast signaling between the BS 610 and the MS 630.

Figure 6:
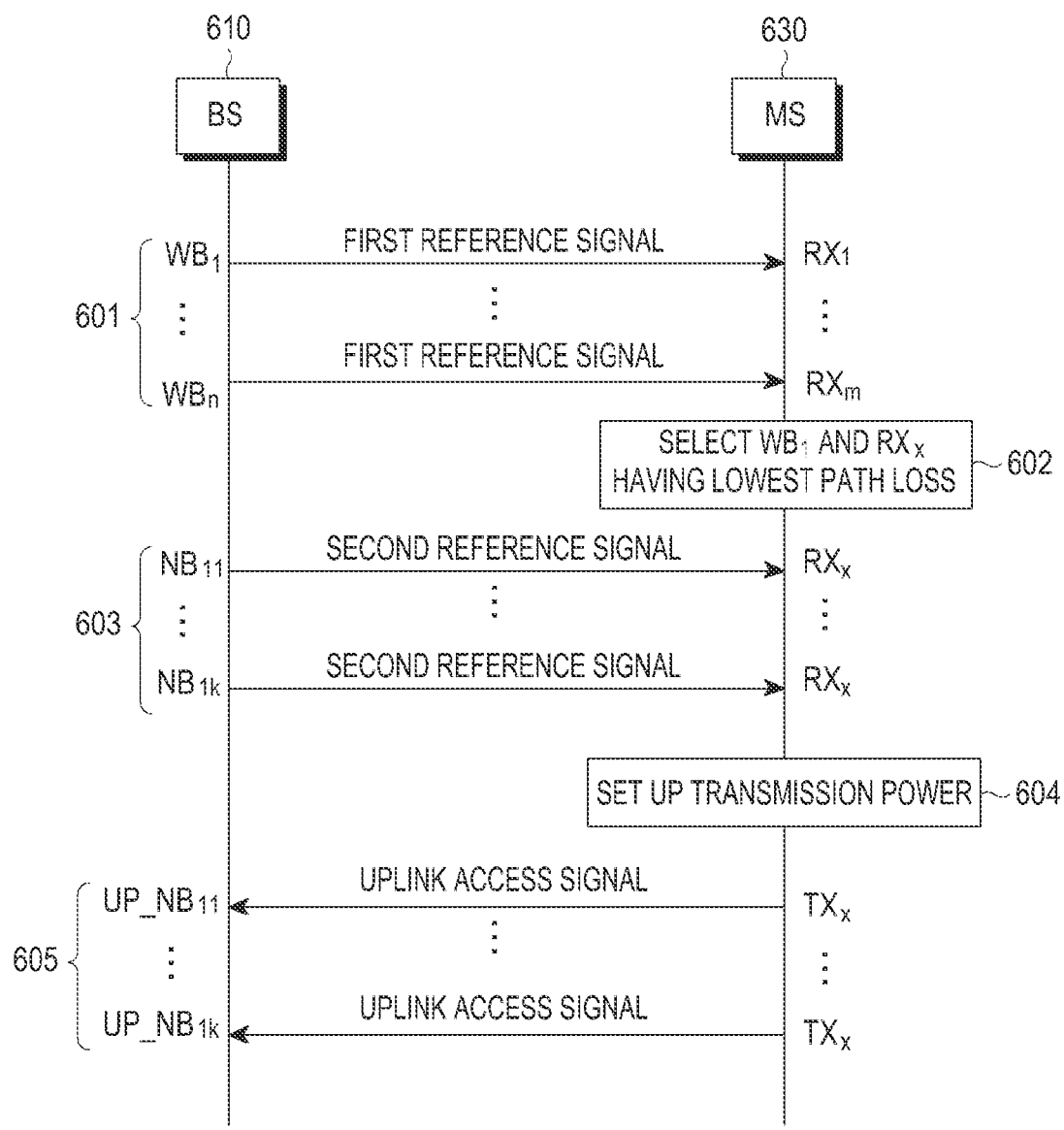
FIG. 6 illustrates a signal transmission/reception process between a BS and an MS in a communication system according to an exemplary embodiment of the present invention.

FIG. 6 illustrates a signal transmission/reception process between a BS and an MS in the communication system according to an exemplary embodiment of the present invention.

Referring to FIG. 6, a detailed description of operations of the BS 610 is omitted because such a description would overlap with the description of the BS of the exemplary embodiment of the present invention illustrated in FIG. 5.

In step 601, the BS 610 repeatedly transmits the first reference signal all over the coverage of the BS 610 that corresponds to, for example, receiving beams RX1 to RXm with wide transmitting beams WB1 to WBn.

Thereafter, the MS 630 receives the first reference signal with the receiving beams RX1 to RXm.

In step 602, the MS 630 measures reception performance of the first reference signal of step 601 received with each of a total of n×m combinations of wide transmitting beams and receiving beams, and selects the wide transmitting beam WB1 and the receiving beam RXx having the lowest path loss from among the n×m combinations of the wide transmitting beams and receiving beams.

In step 603, the BS 610 transmits the second reference signal with narrow transmitting beams NB11 to NBnk that correspond to wide transmitting beams WB1 to WBn.

Thereafter, the MS 630 receives the second reference signal transmitted with the narrow transmitting beams NB11 to NB1$k$ that correspond to the selected wide transmitting beam WB1 by using the selected receiving beam RXx.

In step 604, the MS 630 sets up transmission power for transmitting an uplink access signal based on the received second reference signal. For example, the MS 630 may use a sum of the minimum or maximum path loss value or an average path loss value measured for the downlink narrow transmitting beams NB11 to NB1$k$, a reception power target value, and other power control input values as the transmission power.

Thereafter, in step 605, the MB 630 transmits the uplink access signal with the transmitting beam TXx that corresponds to the selected receiving beam RXx using the set transmission power at an access time or frequency assigned to the uplink narrow receiving beams UL_NB11 to UP_NB1$k$ that correspond to the narrow transmitting beams NB11 to NB1$k$. After transmitting the second reference signal, the BS 610 receives the uplink access signal with at least one of receiving beams that correspond to the narrow transmitting beams NB11 to NBnk.

Figure 7:
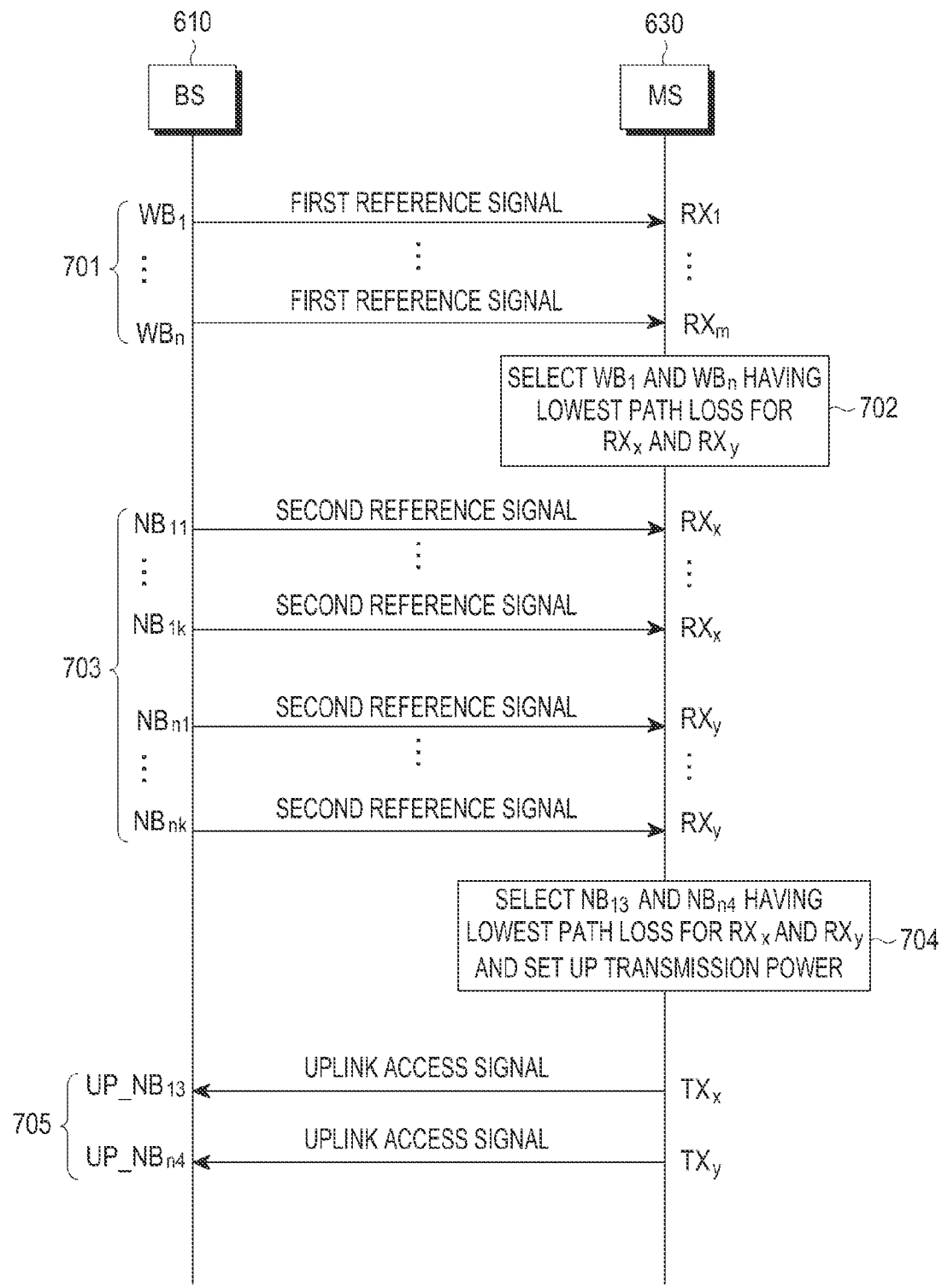
FIG. 7 illustrates a signal transmission/reception process between a BS and an MS in a communication system according to an exemplary embodiment of the present invention.

FIG. 7 illustrates a signal transmission/reception process between a BS and an MS in a communication system according to another exemplary embodiment of the present invention.

Referring to FIG. 7, a detailed description of operations of the BS 610 is omitted because such a description would overlap with the description of the BS of the exemplary embodiment of the present invention illustrated in FIG. 5.

In step 701, the BS 610 repeatedly transmits the first reference signal all over the coverage of the BS 610 that corresponds to, for example, receiving beams RX1 to RXm with wide transmitting beams WB1 to WBn.

Thereafter, the MS 630 receives the first reference signal transmitted from the BS 610 with the receiving beams RX1 to RXm.

In step 702, the MS 630 measures reception performance of the first reference signal of step 701 received with each of a total of n×m combinations of wide transmitting beams and receiving beams, and selects a wide transmitting beam having the lowest path loss for each receiving beam from among the n×m combinations of the wide transmitting beams and receiving beams. In other words, m wide transmitting beams are selected for respective m receiving beams. If the same wide transmitting beam is selected for a plurality of receiving beams, only a combination of a wide transmitting beam and receiving beam having the lowest path loss may be used. As an example, in step 702, wide transmitting beams WB1 and WBn having the lowest path losses for receiving beams RXy and RXx, respectively, are selected.

In step 703, the BS 610 transmits the second reference signal with narrow transmitting beams NB11 to NBnk that correspond to each of wide transmitting beams WB1 to WBn.

The MS 630 receives the second reference signal transmitted with the narrow transmitting beams NB11~NB1$k$ that correspond to the selected wide transmitting beam WB1 by using the receiving beam RXx, and receives the second reference signal transmitted with the narrow transmitting beams NBn1 to NBnk that correspond to the selected wide transmitting beam WBn by using the receiving beam RXy.

In step 704, the MS 630 selects NB13 and NBn4 having the lowest path losses for receiving beams RXx and RXy, respectively, and sets up first transmission power for the first uplink access signal to be transmitted with the transmitting beam TXx that corresponds to the receiving beam RXx based on the second reference signal received with the receiving beam RXx. The MS 630 sets up second transmission power for the second uplink access signal to be transmitted with the transmitting beam TXy that corresponds to the receiving beam RXy based on the second reference signal received with the receiving beam RXy. For example, the MS 630 may use a sum of the minimum or maximum path loss value or an average path loss value measured for the downlink narrow transmitting beams NB11 to NB1$k$, a reception power target value, and other power control input values as the first transmission power. The MS 630 may also use a sum of the minimum or maximum path loss value or an average path loss value measured for the downlink narrow transmitting beams NBn1 to NBnk, a reception power target value, and other power control input values as the second transmission power.

In step 705, the MS 630 transmits the first uplink access signal with the transmitting beam TXx based on the first transmission power at an access time or frequency assigned for the uplink narrow receiving beam UL_NB13 that corresponds to the downlink narrow transmitting beam NB13. The MS 630 also transmits the second uplink access signal with the transmitting beam TXy using the second transmission power at an access time or frequency assigned for the uplink narrow receiving beam UL NBn4 that corresponds to the downlink narrow transmitting beam NBn4. According to exemplary embodiments of the present invention, through the signal transmission/reception process of FIG. 7, the MS 630 may select a narrow transmitting beam optimal to data transmission/reception from among narrow transmitting beams provided by the BS 610 for each receiving beam.

Figure 8:
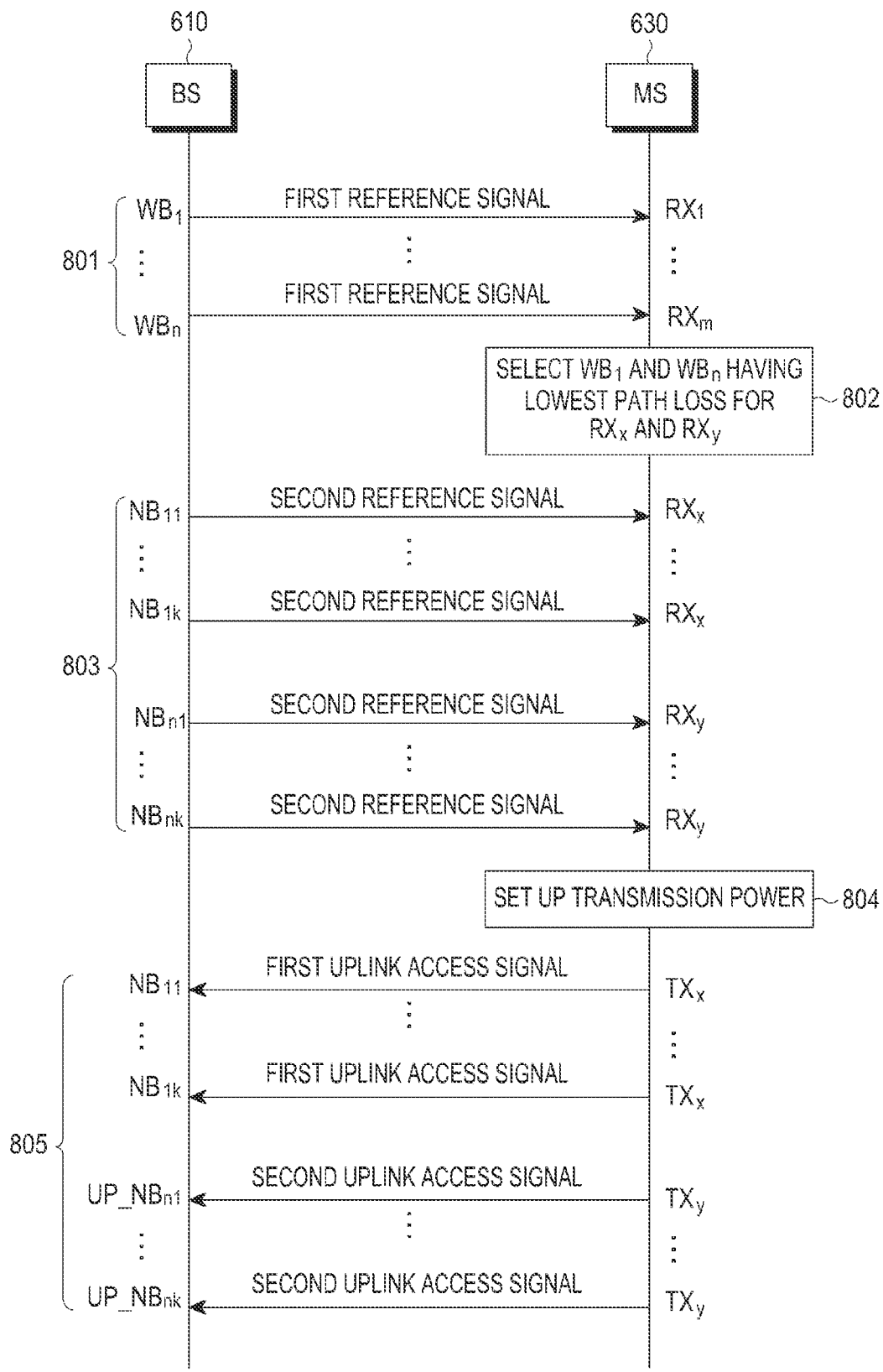
FIG. 8 illustrates a signal transmission/reception process between a BS and an MS in a communication system according to another exemplary embodiment of the present invention.

FIG. 8 illustrates a signal transmission/reception process between a BS and an MS in a communication system according to another exemplary embodiment of the present invention.

Referring to FIG. 8, a detailed description of operations of the BS 610 is omitted because such a description would overlap with the description of the BS of the exemplary embodiment of the present invention illustrated in FIG. 5.

In step 801, the BS 610 repeatedly transmits the first reference signal all over its coverage that corresponds to, for example, receiving beams RX1 to RXm with wide transmitting beams WB1 to WBn.

The MS 630 receives the first reference signal transmitted from the BS 610 with the receiving beams RX1 to RXm.

In step 802, the MS 630 selects, for example, wide transmitting beams WB1 and WBn with the lowest path losses for receiving beams RXx and RXy, respectively, using the same method of step 702 of FIG. 7.

In step 803, the BS 610 transmits the second reference signal with narrow transmitting beams NB11 to NBnk that correspond to each of wide transmitting beams WB1 to WBn.

The MS 630 then receives the second reference signal transmitted with the narrow transmitting beams NB11 to NB1k that correspond to the selected wide transmitting beam WB1 by using the receiving beam RXx, and receives the second reference signal transmitted with the narrow transmitting beams NBn1 to NBnk that correspond to the selected wide transmitting beam WBn by using the receiving beam RXy.

The MS 630 sets up transmission power for the first uplink access signal to be transmitted with the transmitting beam TXx that corresponds to the receiving beam RXx based on the second reference signal received with the receiving beam RXx, in step 804. And the MS 630 sets up transmission power for the second uplink access signal to be transmitted with the transmitting beam TXy that corresponds to the receiving beam RXy based on the second reference signal received with the receiving beam RXy. In this regard, the MS 630 may use a sum of the minimum or maximum path loss value or an average path loss value measured for the downlink narrow transmitting beams NB11 to NB1k, a reception power target value, and other power control input values as the first transmission power for the first uplink access signal. The MS 630 may also use a sum of the minimum or maximum path loss value or an average path loss value measured for the downlink narrow transmitting beams NBn1 to NBnk, a reception power target value, and other power control input values as the second transmission power for the second uplink access signal.

In step 805, the MS 630 transmits the first uplink access signal with the transmitting beam TXx based on the first transmission power at an access time or frequency assigned for the uplink narrow receiving beams UL_NB11 to UL_NB1k that correspond to the downlink narrow transmitting beam NB11 to NB1k. The MS 630 also transmits the second uplink access signal with the transmitting beam TXy based on the second transmission power at an access time or frequency assigned for the uplink narrow receiving beams UL NBn1 to UL NBnk that correspond to the downlink narrow transmitting beams NBn1 to NBnk.

After transmitting the second reference signal, the BS 610 receives the uplink access signal using at least one of receiving beams that correspond to narrow transmitting beams NB11 to NBnk provided by the BS 610.

Figure 9:
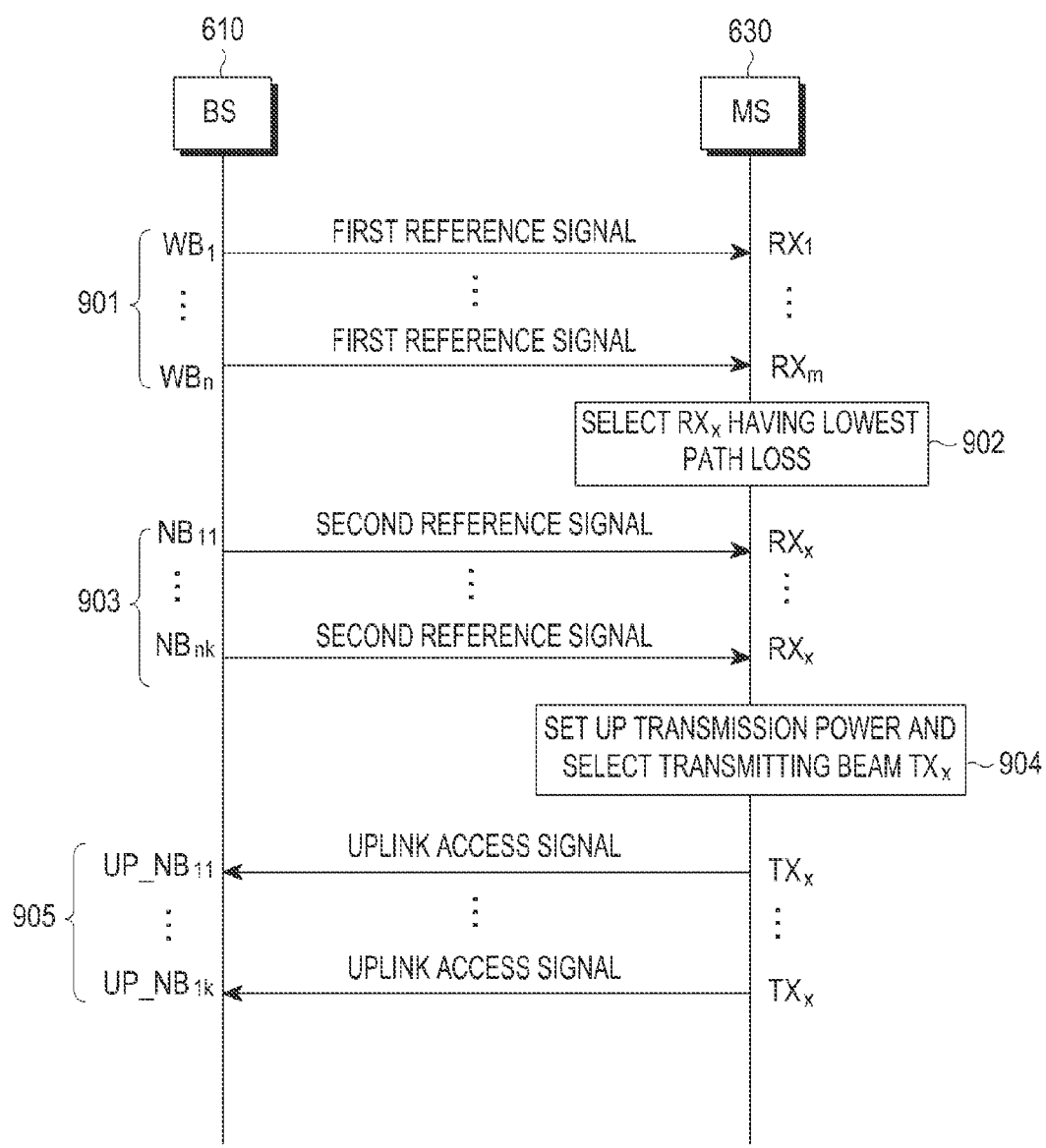
FIG. 9 illustrates a signal transmission/reception process between a BS and an MS in a communication system according to an exemplary embodiment of the present invention.

FIG. 9 illustrates a signal transmission/reception process between a BS and an MS 630 in a communication system according to an exemplary embodiment of the present invention.

Referring to FIG. 9, a detailed description of operations of the BS 610 is omitted because such a description would overlap with that of the exemplary embodiment of the present invention illustrated in FIG. 5.

In step 901, the BS 610 transmits the first reference signal all over the coverage of the BS 610 with wide transmitting beams WB1 to WBn. In this regard, the BS 610 repeatedly transmits the first reference signal for each receiving beam of the MS 630 by taking into account the number of receiving beams of the MS 630. Then the MS 630 receives the first reference signal with the receiving beams RX1 to RXm, for example.

In step 902, the MS 630 measures reception performance of the first reference signal received with each of a total of n×m combinations of wide transmitting beams and receiving beams, and selects the receiving beam RXx having the lowest path loss from among the n×m combinations of the wide transmitting beams and receiving beams.

In step 903, the BS 610 transmits the second reference signal with narrow transmitting beams NB11 to NBnk that correspond to each of wide transmitting beams WB1 to WBn. Then, the MS 630 receives the second reference signal transmitted with the narrow transmitting beams NB11 to NBnk that correspond to all the wide transmitting beams WB1 to WBn by using the selected receiving beam RXx.

In step 904, the MS 630 sets up transmission power for transmitting an uplink access signal based on the received second reference signal. For example, the MS 630 may use a sum of the minimum or maximum path loss value or an average path loss value measured for the downlink narrow transmitting beams NB11 to NBnk, a reception power target value, and other power control input values as the transmission power. And the MS 630 may select a single narrow transmitting beam having the lowest path loss or i narrow transmitting beams having the lowest path losses by calculating path losses between the narrow transmitting beams NB11 to NBnk and the receiving beam RXx. According to an exemplary embodiment of the present invention, as illustrated in FIG. 9, the MS 630 selects k narrow transmitting beams from NB11 to NB1k and transmits the uplink access signal with the transmitting beam TXx that corresponds to the receiving beam RXx at an access time or frequency assigned for the uplink narrow receiving beams UL_NB11 to UL_NB1k that correspond to the transmitting beams NB11 to NB1k.

In step 905, the MS 630 transmits the uplink access signal with the transmitting beam TXx that corresponds to the selected receiving beam RXx based on the set transmission power at an access time or frequency assigned for the uplink narrow receiving beams UL_NB11 to UP NB1k that correspond to the narrow transmitting beams NB11 to NB1k. The BS 610 then receives the uplink access signal using at least one of receiving beams that correspond to the narrow transmitting beams NB11 to NB1k provided by the BS 610.

Figure 10:
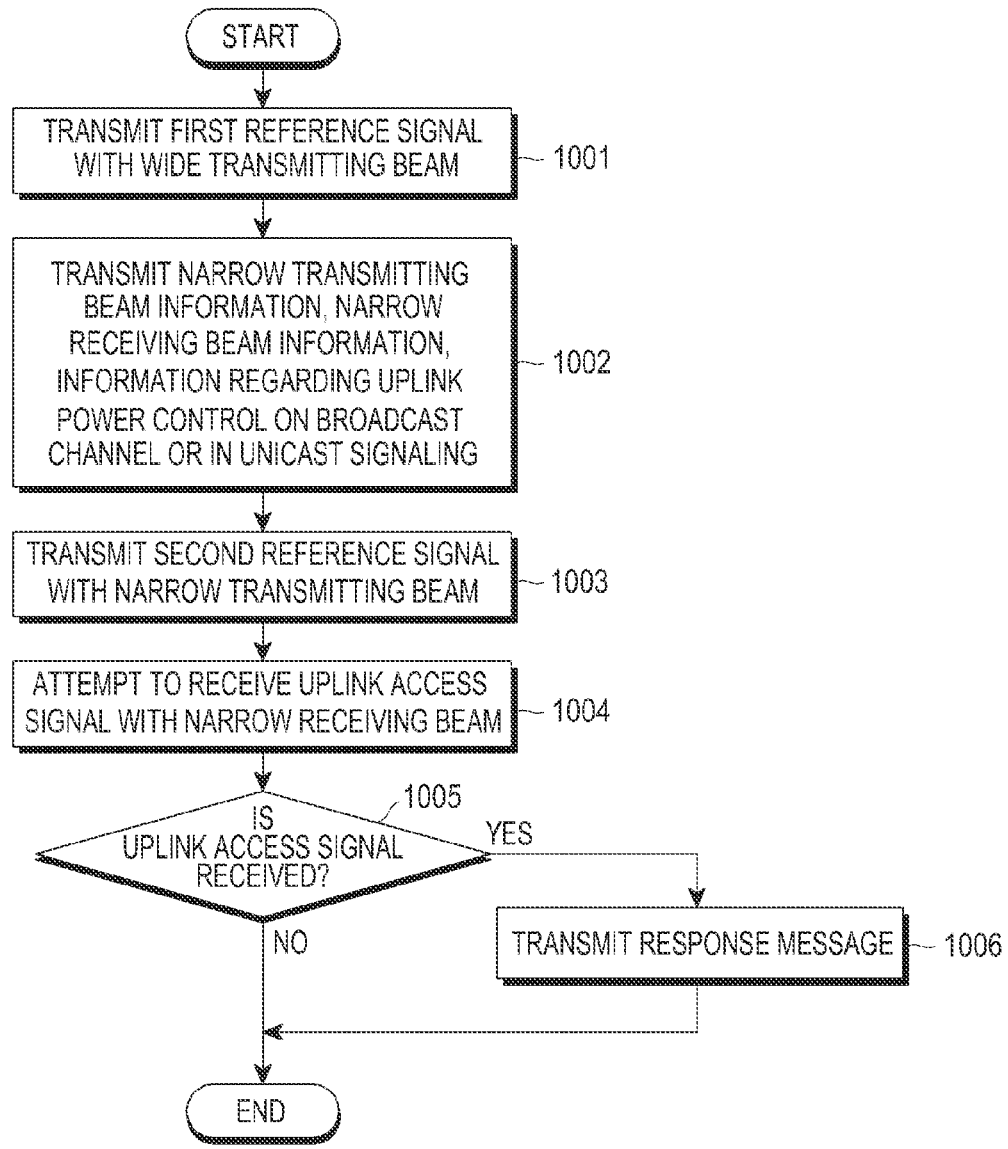
FIG. 10 is a flowchart of operations of a base station that transmits/receives signals in a communication system according to an exemplary embodiment of the present invention.

FIG. 10 is a flowchart of operations of a BS that transmits/receives signals in a communication system according to an exemplary embodiment of the present invention. For example, FIG. 10 is a flowchart of operations of a BS that transmits/receives signals in a communication system according to an exemplary embodiment of the present invention in which a BS transmits first and second reference signals and receives an uplink access signal from a MS.

Referring to FIG. 10, in step 1001, the BS 610 transmits the first reference signal with at least one wide transmitting beam. In this regard, the BS 610 transmits the first reference signal more than once for each wide transmitting beam.

In step 1002, the BS 610 transmits at least one of narrow transmitting beam information, narrow receiving beam information, and information regarding uplink power control on the broadcast channel or in unicast signaling. The narrow transmitting beam information may include at least one of information about the number of narrow transmitting beams that correspond to a wide transmitting beam, information about transmission time of downlink narrow transmitting beams with which to transmit the second reference signal, and other information regarding the second reference signal. The narrow receiving beam information may include information about reception time of each of the uplink narrow receiving beams that corresponds to each of the downlink narrow transmitting beams and related frequency resource. The information regarding the uplink power control includes at least one of transmission power information of the first and second reference signals, a reception power target value of the uplink transmitting signal and other power control related input values.

In contrast, according to an exemplary embodiment of the present invention, at least one of the narrow transmitting beam information, the narrow receiving beam information, and the information regarding the uplink power control may be set up (e.g., configured) in advance between the BS 610 and the MS 630. According to such an exemplary embodiment of the present invention, the BS 610 may not perform step 1002.

In step 1003, the BS 610 transmits the second reference signal with at least one downlink narrow transmitting beam that corresponds to the downlink wide transmitting beam at a transmission time of the downlink narrow transmitting beam with which to transmit the second reference signal.

In step 1004, the BS 610 attempts to receive the uplink access signal transmitted from the MS 630 with the at least one narrow receiving beam that corresponds to the at least one downlink narrow transmitting beam.

In step 1005, the BS 610 determines whether the uplink access signal has been received. If the uplink access signal has been received, the BS 610 proceeds to step 1006 in which BS 610 transmits a response message to the received uplink access signal. Otherwise, if no uplink access signal is received in step 1005, the BS 610 ends this process.

Figure 11:
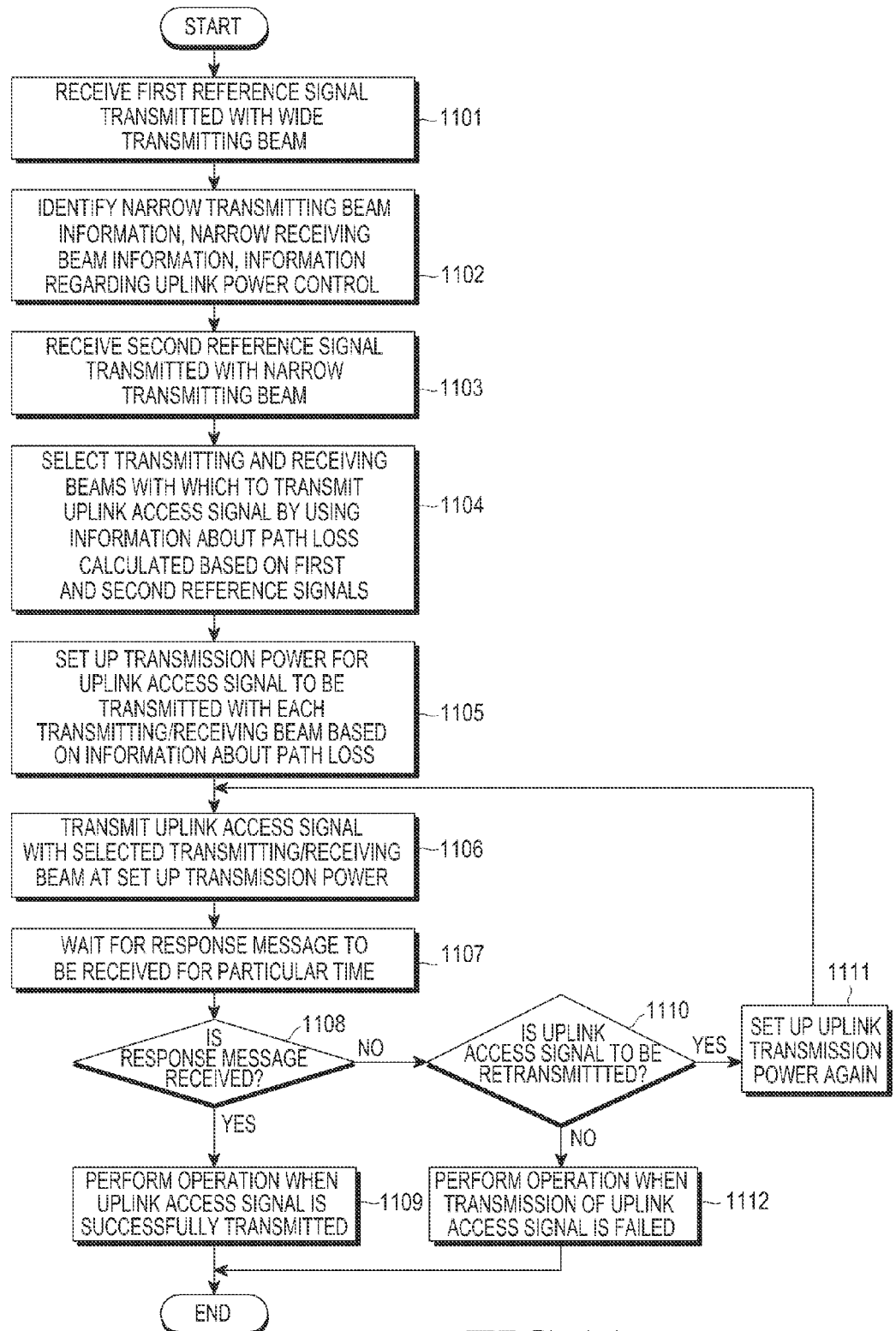
FIG. 11 is a flowchart of operations of a terminal that transmits/receives signals in a communication system according to an exemplary embodiment of the present invention.

FIG. 11 is a flowchart of operations of a terminal that transmits/receives signals in a communication system according to an exemplary embodiment of the present invention. For example, FIG. 11 is a flowchart of operations of an MS that transmits/receives signals in a communication system according to an exemplary embodiment of the present invention in which a MS transmits the uplink access signal by setting up transmission time, transmission direction, and transmission power for the uplink access signal.

Referring to FIG. 11, in step 1101, the MS 630 receives the first reference signal transmitted with the at least one wide transmitting beam with the at least one receiving beam.

In step 1102, the MS 630 identifies at least one of narrow transmitting beam information, narrow receiving beam information, and information regarding uplink power control on the broadcast control channel or in unicast signaling. The narrow transmitting beam information includes at least one of information about the number of narrow transmitting beams that correspond to a wide transmitting beam, information about transmission time of downlink narrow transmitting beams with which to transmit the second reference signal, and other information regarding the second reference signal. The narrow receiving beam information includes reception time of each of the uplink narrow receiving beams that corresponds to each of the downlink narrow transmitting beams and related frequency resource. The information regarding the uplink power control includes at least one of transmission power information of the first and second reference signals, a reception power target value of the uplink transmitting signal and other power control related input values.

In step 1103, the MS 630 receives the second reference signal transmitted with the at least one narrow transmitting beam at the transmission time of the received downlink narrow transmitting beam.

According to an exemplary embodiment of the present invention, in step 1104, the MS 630 selects an uplink transmitting beam and at least one uplink narrow receiving beam for transmitting the uplink access signal by using path loss information calculated based on the first and second reference signals.

In step 1105, the MS 630 sets up transmission power for the uplink access signal to be transmitted with each of the uplink narrow receiving beams based on the calculated path loss information.

In step 1106, the MS 630 uses the transmission power, to transmit the uplink access signal with the selected uplink transmitting beam at the access time and frequency assigned for the selected at least one uplink narrow receiving beam.

In step 1107, the MS 630 waits for a response message to the uplink access signal from the BS 610 for a waiting time determined in advance or received as one piece of the uplink power control related input information.

In step 1108, the MS 630 determines whether the response message from the BS 610 within the waiting time.

If the response message is received from the BS 610 within the waiting time, then the MS 630 determines that the uplink access signal was transmitted successfully and the BS 610 received the uplink access signal, and the MS 630 proceeds to step 1109 in which the MS 630 performs the remaining operations. Thereafter, the MS 630 ends the uplink transmission operation. According to exemplary embodiments of the present invention, the remaining operations may include a collision resolution operation for resolving collisions when the uplink access signal transmitted by the MS 630 conflicts with any other uplink access signal transmitted by another terminal using the same resource and a channel establishment operation to be performed after uplink transmission and channel connection.

Conversely, if the MS 630 determines that no response message is received within the waiting time in step 1108, the MS 630 proceeds to step 1110 in which the MS 630 determines whether to retransmit the uplink access signal by a predetermined rule. If the uplink access signal is to be retransmitted, the MS 630 proceeds to step 1111. In contrast, if the uplink access signal is not to be retransmitted, the MS 630 proceeds to step 1112.

In step 1110, the determination may be based on at least one piece of information about maximum uplink transmission power, whether to retransmit the uplink access signal, and the frequency of retransmission of the uplink access signal among the uplink power control related input information received in step 1102.

After determining that the uplink access signal is to be retransmitted, the MS 630 increases or changes the uplink transmission power in step 1111, and returns to step 1106 in which the MS 630 performs the operation of receiving the uplink access signal again.

In contrast, if the MS 630 determines not to retransmit the uplink access signal, the MS 630 performs operations to be performed when transmission of the uplink access signal is failed, in step 1112. Thereafter, the MS 630 ends the process. According to exemplary embodiments of the present invention, the operation to be performed when transmission of the uplink access signal is failed may include an operation of retrying to transmit the uplink signal all over again after a delay of particular period of time received as one piece of the uplink power control related input information.

Figure 12:
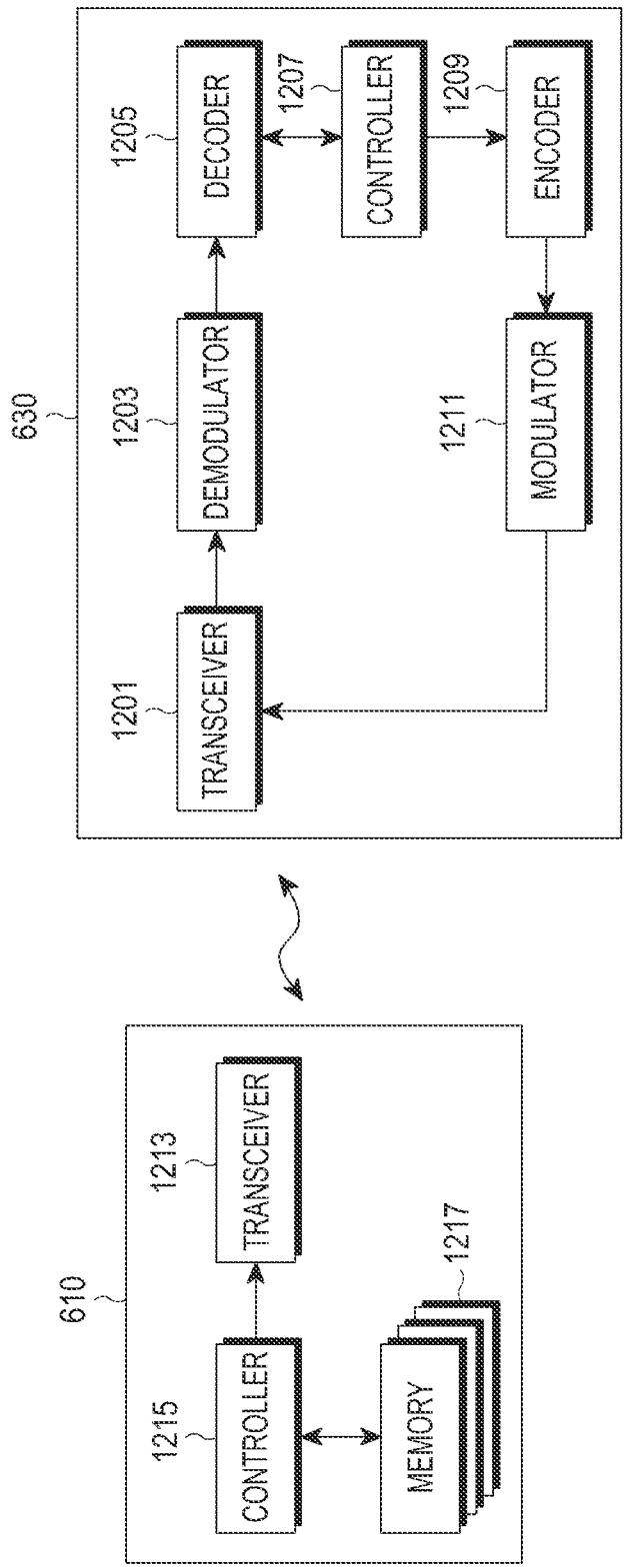
FIG. 12 is a block diagram of a BS and an MS that transmit/receive signals in a communication system according to an exemplary embodiment of the present invention.

FIG. 12 is a block diagram of a BS and an MS that transmit/receive signals in a communication system according to an exemplary embodiment of the present invention.

Referring to FIG. 12, a detailed description of operations performed at each block of FIG. 12 will be omitted because operations of the BS 610 and the MS 630 were described in detail in connection with FIGS. 3 to 11.

According to an exemplary embodiment of the present invention, the MS 630 for efficiently setting up a transmission time, a transmission direction, and a transmission power for the uplink access signal includes transceiver (or front end) 1201, a demodulator 1203, a decoder 1205, a controller 1207, an encoder 1209, and a modulator 1211.

The transceiver 1201 receives a sync channel, a broadcast channel, a data channel, and/or the like. The transceiver 1201 receives the first and second reference signals transmitted with at least one wide transmitting beam and narrow transmitting beams that correspond to each of the at least one wide transmitting beam by using at least one receiving beam (or in at least one receiving direction). The demodulator 1203 demodulates the first and second reference signals and the decoder 1205 decodes the first and second reference signal and provides the results to the controller 1207.

The controller 1207 selects an uplink narrow transmitting beam based on the decoded first and second reference signals and a path loss for each transmission/reception path, and sets up transmission power for the uplink access signal to be transmitted in the direction of the selected uplink narrow transmitting beam.

The encoder 1209 encodes the uplink access signal and the modulator 1211 modulates and transmits the uplink access signal through the transceiver 1201 at the set up transmission power in the set up transmission direction.

According to an exemplary embodiment of the present invention, the BS 610 for transmitting the first and second reference signals and receiving the uplink access signal includes an RF unit 1213 (or transceiver), a controller 1215, and a memory 1217.

The controller 1215 is configured to have separate sections of a scheduler and a control part, and the memory 1217 may be configured with data queues.

The RF unit 1213 transmits the first and second reference signals with at least one transmitting beam having a different beam width and receives the uplink access signal with at least one receiving beam, under control of the controller 1215. The controller 1215 controls the timing of transmitting the first reference signal with the at least one wide transmitting beam, transmitting the second reference signal with narrow transmitting beams that correspond to each of the at least one wide transmitting beam, and receiving the uplink access signal.

The memory 1217 stores data received from upper network nodes on the terminal basis or on the service basis.

As a non-exhaustive illustration only, a terminal described herein may refer to mobile devices such as a cellular phone, a Personal Digital Assistant (PDA), a digital camera, a portable game console, and an MP3 player, a Portable/Personal Multimedia Player (PMP), a handheld e-book, a portable lap-top Personal Computer (PC), a tablet PC, a Global Positioning System (GPS) navigation, and devices such as a desktop PC, a high definition television (HDTV), an optical disc player, a setup box, and the like capable of wireless communication or network communication consistent with that disclosed herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a signal by a terminal in a communication system, the method comprising:
    receiving, from a base station, first reference signals;
    selecting at least one receiving beam of the terminal based on first measurements of the first reference signals;
    receiving, from the base station, second reference signals through the selected at least one receiving beam of the terminal;
    determining a transmitting power based on second measurements of the second reference signals; and
    transmitting, to the base station, the signal using the transmitting power.

2. The method of claim 1, wherein the selecting of the at least one receiving beam comprises selecting at least one transmitting beam of the base station among a plurality of transmitting beams of the base station using the first measurements of the first reference signals.

3. The method of claim 2,
    wherein the first reference signals are transmitted through the plurality of transmitting beams of the base station, and
    wherein the second reference signals are transmitted through sub beams of the base station included in the selected at least one transmitting beam of the base station.

4. The method of claim 1, wherein the determining the transmitting power comprises:
    selecting at least one transmitting beam of the base station among a plurality of transmitting beams of the base station using the first measurements;
    selecting a part of second reference signals among the second reference signals, the part of second reference signals being transmitted through sub beams of the base station included in the at least one transmitting beam of the base station, and
    determining the transmitting power using partial measurements of the part of second reference signals.

5. The method of claim 1,
    wherein the first reference signals are transmitted through a plurality of transmitting beams of the base station, and
    wherein the second reference signals are transmitted through each of sub beams of the base station included in each of the plurality of the transmitting beams.

6. The method of claim 4, wherein the transmitting, to the base station, the signal comprises:
    determining at least one transmitting beam of the terminal corresponding to the at least one receiving beam of the terminal; and
    transmitting the signal through the determined at least one transmitting beam of the terminal with the determined transmitting power.

7. A method for receiving a signal by a base station in a communication system, the method comprising:
    transmitting, to a terminal, first reference signals through a plurality of transmitting beams of the base station;
    transmitting, to the terminal, second reference signals through each of transmitting sub beams included in each of the plurality of the transmitting beams; and
    receiving, from the terminal, the signal transmitted with a transmitting power of the terminal determined using measurements of at least one second reference signal selected among the second reference signals,
    wherein the selected at least one second reference signal is transmitted through transmitting sub beams included in each of at least one transmitting beam of the base station, and
    wherein the at least one transmitting beam of the base station is selected from the plurality of transmitting beams based on first measurements of the first reference signals.

8. The method of claim 7, wherein the signal is received through one of receiving sub beams of the base station corresponding to the transmitting sub beams of the base station.

9. The method of claim 7, wherein the signal comprises a channel access signal to the base station.

10. A terminal for transmitting a signal in a communication system, the terminal comprising:

a transceiver configured to:
receive, from a base station, first reference signals, and
receive, from the base station, second reference signals through at least one receiving beam of the terminal; and
at least one processor configured to:
select the at least one receiving beam of the terminal based on first measurements of the first reference signals, and
determine a transmitting power based on second measurements of the second reference signals, and
control the transceiver to transmit, to the base station, the signal using the transmitting power.

11. The terminal of claim 10, wherein the at least one processor is further configured to select at least one transmitting beam of the base station among a plurality of transmitting beams of the base station using measurements of the first reference signals.

12. The terminal of claim 11,
wherein the first reference signals are transmitted through the plurality of transmitting beams of the base station, and
wherein the second reference signals are transmitted through sub beams of the base station included in the selected at least one transmitting beam of the base station.

13. The terminal of claim 12, wherein the at least one processor is further configured to:
select at least one transmitting beam of the base station among a plurality of transmitting beams of the base station using the first measurements,
select a part of second reference signals among the second reference signals, the part of second reference signals being transmitted through sub beams of the base station included in the at least one transmitting beam of the base station, and
determine the transmitting power using partial measurements of the part of second reference signals.

14. The terminal of claim 10,
wherein the first reference signals are transmitted through a plurality of transmitting beams of the base station, and
wherein the second reference signals are transmitted through each of sub beams of the base station included in each of the plurality of the transmitting beams.

15. The terminal of claim 13, wherein the at least one processor is further configured to:
determine at least one transmitting beam of the terminal corresponding to at least one receiving beam of the terminal, and
control the transceiver to transmit the signal through the determined at least one transmitting beam of the terminal with the determined transmitting power.

16. A base station for receiving a signal in a communication system, the base station comprising:
a transceiver configured to:
transmit, to a terminal, first reference signals through a plurality of transmitting beams of the base station,
transmit, to the terminal, second reference signals through each of transmitting sub beams included in each of the plurality of transmitting beams, and
receive, from the terminal, the signal transmitted with a transmitting power of the terminal determined using measurements of at least one second reference signal selected among the second reference signals,
wherein the selected at least one second reference signal is transmitted through transmitting sub beams included in each of at least one transmitting beam of the base station, and
wherein the at least one transmitting beam of the base station is selected from the plurality of transmitting beams based on first measurements of the first reference signals.

17. The base station of claim 16, wherein the signal is received through one of receiving sub beams of the base station corresponding to the transmitting sub beams of the base station.

18. The base station of claim 16, wherein the signal comprises a channel access signal.

19. The method of claim 1, wherein the signal comprises a channel access signal.

20. The terminal of claim 10, wherein the signal comprises a channel access signal.

* * * * *